(12) United States Patent
Takiguchi et al.

(10) Patent No.: US 10,681,577 B2
(45) Date of Patent: Jun. 9, 2020

(54) BASE STATION AND TRANSMISSION METHOD

(71) Applicant: NTT DOCOMO, INC., Tokyo (JP)

(72) Inventors: Takahiro Takiguchi, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 157 days.

(21) Appl. No.: 15/761,566

(22) PCT Filed: Jan. 17, 2017

(86) PCT No.: PCT/JP2017/001430
§ 371 (c)(1),
(2) Date: Mar. 20, 2018

(87) PCT Pub. No.: WO2017/130801
PCT Pub. Date: Aug. 3, 2017

(65) Prior Publication Data
US 2018/0343577 A1    Nov. 29, 2018

(30) Foreign Application Priority Data
Jan. 26, 2016   (JP) ................. 2016-012528

(51) Int. Cl.
*H04W 24/10* (2009.01)
*H04W 16/14* (2009.01)
(Continued)

(52) U.S. Cl.
CPC .......... *H04W 24/10* (2013.01); *H04W 16/14* (2013.01); *H04W 16/32* (2013.01); *H04W 72/04* (2013.01); *H04W 72/08* (2013.01); *H04W 72/085* (2013.01)

(58) Field of Classification Search
None
See application file for complete search history.

(56) References Cited

U.S. PATENT DOCUMENTS

2016/0066195 A1* 3/2016 Moon ................... H04W 16/14
                                                          455/454
2016/0174095 A1* 6/2016 Damnjanovic ....... H04W 36/24
                                                          370/252
(Continued)

FOREIGN PATENT DOCUMENTS

WO    2015/141584 A1    9/2015

OTHER PUBLICATIONS

International Search Report of the International Searching Authority issued in PCT/JP2017/001430 dated Apr. 18, 2017 (4 pages).
(Continued)

*Primary Examiner* — Kenny S Lin
(74) *Attorney, Agent, or Firm* — Osha Liang LLP

(57) ABSTRACT

A base station used as a first base station in a wireless communication system including the first base station, a second base station that communicates with the first base station, and a user equipment that communicates with the first base station includes: a reception unit that receives a parameter used for performing communication in a specific band and data to be transmitted toward the user equipment from the second base station; and a detection unit that performs a process of detecting a use state of the specific band according to the parameter when the data is transmitted to the user equipment.

12 Claims, 14 Drawing Sheets

(51) Int. Cl.
*H04W 72/04* (2009.01)
*H04W 72/08* (2009.01)
*H04W 16/32* (2009.01)

(56) References Cited

U.S. PATENT DOCUMENTS

2017/0118728 A1\* 4/2017 Harada ................ H04W 52/38
2017/0311320 A1\* 10/2017 Lunttila ................ H04L 5/001
2018/0241486 A1\* 8/2018 Heo ..................... H04W 24/10

OTHER PUBLICATIONS

Written Opinion of the International Searching Authority issued in PCT/JP201/001430 dated Apr. 18, 2017 (4 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
AT&T; "Drivers, Benefits and Challenges for LTE in Unlicensed Spectrum"; 3GPP TSG-RAN Meeting #62, RP-131701; Busan, Korea; Dec. 3-6, 2013 (3 pages).
Coolpad; "Discussion on high layer impact of LAA"; 3GPP TSG-RAN WG2 #89, R2-150174; Athens, Greece; Feb. 9-13, 2015 (3 pages).
Sequans Communications; "Considerations on RSSI Measurements for LAA"; 3GPP TSG-RAN WG2 #92, R2-156715; Anaheim, USA; Nov. 16-20, 2015 (4 pages).

\* cited by examiner

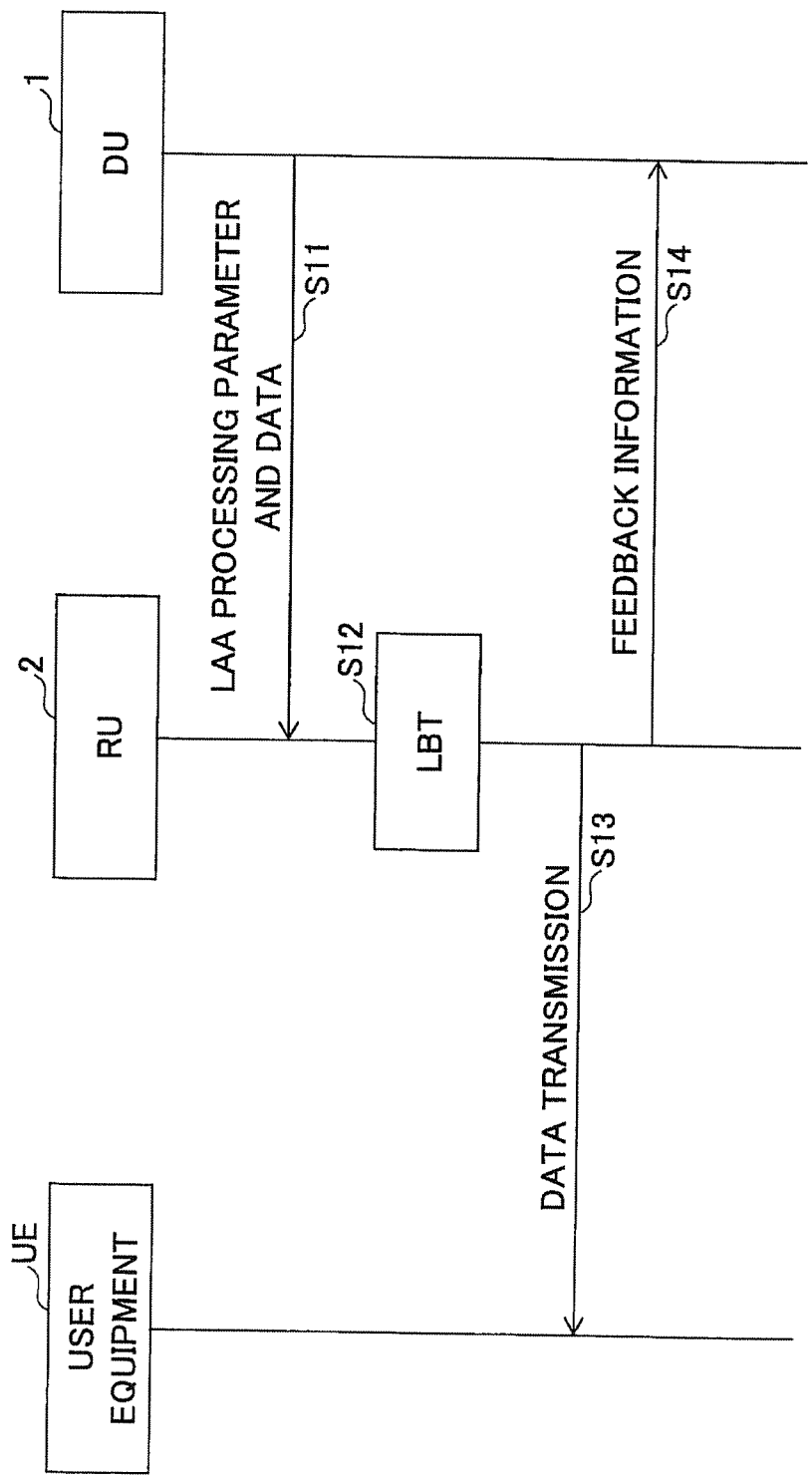

FIG.7

| LBT-RELATED INFORMATION | |
|---|---|
| | NECESSITY OF LBT EXECUTION |
| | LARGEST BACKOFF TIME |
| | CARRIER SENSE TIME |
| TRANSMISSION-RELATED INFORMATION | |
| | LARGEST SUCCESSIVE TRANSMISSION TIME |
| | TRANSMISSION POWER |
| | UNLICENSED BAND FREQUENCY RANGE |
| | DATA TRANSMISSION STARTING SYMBOL POSITION |
| | DATA TRANSMISSION ENDING SYMBOL POSITION |

FIG.8

| LBT RESULT | |
|---|---|
| | DATA TRANSMITTABILITY |
| | LBT SETTING INFORMATION |

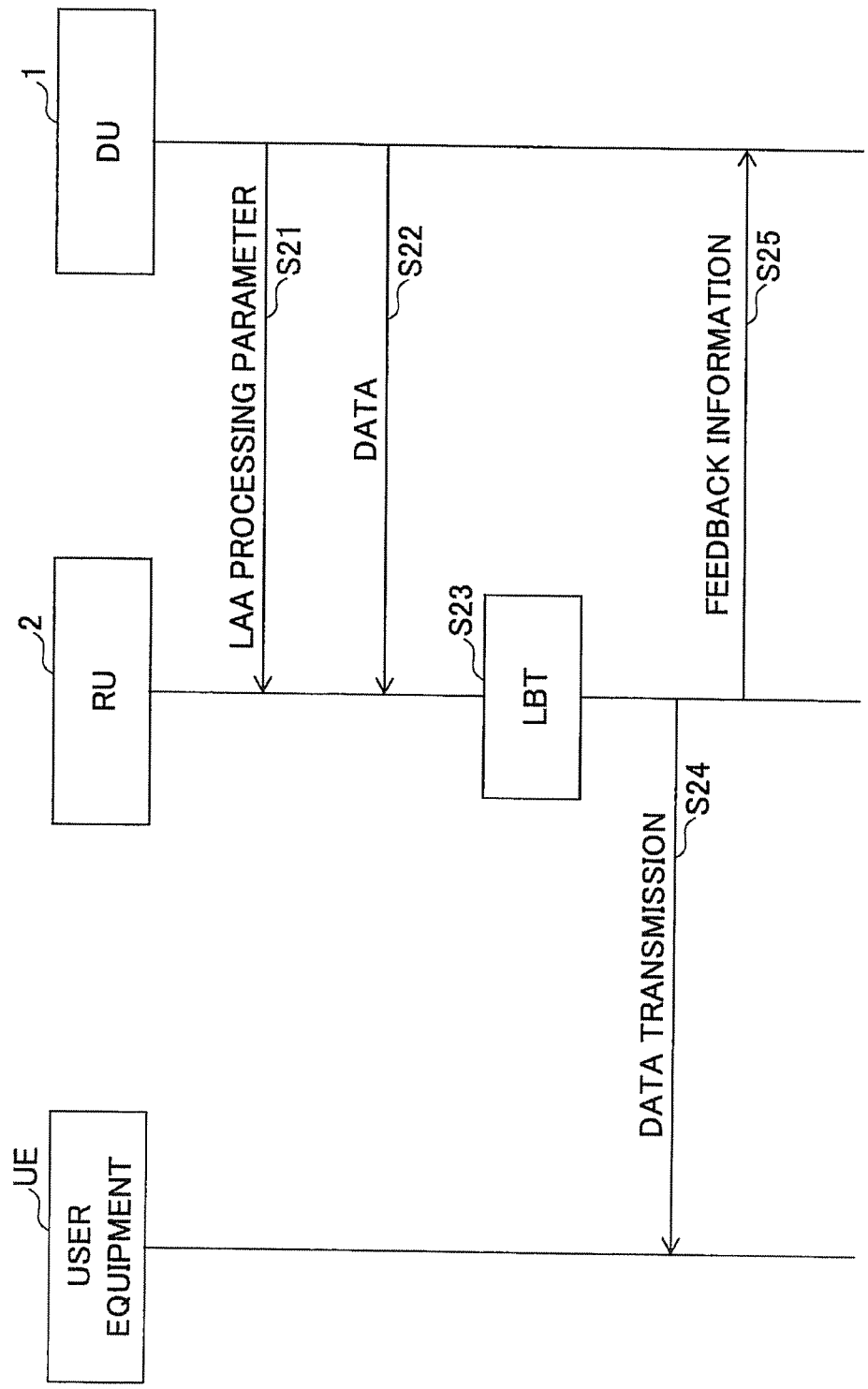

FIG.10

| LBT-RELATED INFORMATION | |
|---|---|
| | NECESSITY OF LBT EXECUTION |
| | LARGEST BACKOFF TIME |
| | CARRIER SENSE TIME |
| TRANSMISSION-RELATED INFORMATION | |
| | LARGEST SUCCESSIVE TRANSMISSION TIME |
| | TRANSMISSION POWER |
| | UNLICENSED BAND FREQUENCY RANGE |
| | DATA TRANSMISSION STARTING SYMBOL POSITION |
| | DATA TRANSMISSION ENDING SYMBOL POSITION |
| SURROUNDING WIRELESS SYSTEM INFORMATION | |

FIG.11

| LBT RESULT | |
|---|---|
| | DATA TRANSMITTABILITY |
| | LBT SETTING INFORMATION |
| | SURROUNDING WIRELESS SYSTEM INFORMATION |

FIG.13

| LBT-RELATED INFORMATION | |
|---|---|
| | NECESSITY OF LBT EXECUTION |
| | LARGEST BACKOFF TIME |
| | CARRIER SENSE TIME |
| TRANSMISSION-RELATED INFORMATION | |
| | LARGEST SUCCESSIVE TRANSMISSION TIME |
| | TRANSMISSION POWER |
| | UNLICENSED BAND FREQUENCY RANGE |
| | DATA TRANSMISSION STARTING SYMBOL POSITION |
| | DATA TRANSMISSION ENDING SYMBOL POSITION |
| SURROUNDING WIRELESS SYSTEM INFORMATION | |
| UE MEASUREMENT SETTING INFORMATION | |

FIG.14

| |
|---|
| REFERENCE SIGNAL TRANSMISSION RESULT |
| RU MEASUREMENT RESULT |
| UE MEASUREMENT RESULT |

BASE STATION AND TRANSMISSION METHOD

TECHNICAL FIELD

The present invention relates to a base station and a transmission method.

BACKGROUND ART

In a UMTS (Universal Mobile Telecommunication System) network, an LTE (Long Term Evolution) has been specified with the aim to further increase the data rate and reduce the latency (Non-Patent Document 1). An LTE-advanced has been specified with the aim to further broaden the frequency band and increase the data rate from the LTE, and a successor system of the LTE called 5G (5th generation mobile communication system), for example has been discussed.

LTE Rel.8 to 12 have been specified assuming that exclusive operations are performed in a frequency band (that is, a licensed band) permitted to a business operator. For example, 800 MHz, 2 GHz, or 1.8 GHz is used as the licensed band.

A wide spread of high-functionality user equipments such as smartphones or tablets has increased user traffic rapidly. To absorb this increasing user traffic, although it is necessary to add additional frequency bands, there is a limit on the licensed band spectrum (licensed spectrum). Due to this, expanding the frequencies of an LTE system using an available unlicensed spectrum band (this is referred to as an unlicensed band) other than the licensed band has been discussed (Non-Patent Document 2). For example, 2.4 GHz or 5 GHz as used by Wi-Fi (registered trademark) is used as the unlicensed band. LTE Rel.13 discusses CA (Carrier Aggregation) to be performed between the licensed band and the unlicensed band as illustrated in FIG. 1. In this manner, communication performed using the unlicensed band together with the licensed band is referred to as LAA (License-Assisted Access). In future, dual connectivity of the licensed band and the unlicensed band and standalone of the unlicensed band will be the subject to be discussed in LAA.

CITATION LIST

Non-Patent Document

Non-Patent Document 1: 3GPP TS 36.300 "Evolved Universal Terrestrial Radio Access (E-UTRA) and Evolved Universal Terrestrial Radio Access Network (E-UTRAN); Overall description; Stage 2" V12.4.0 (2014-12)
Non-Patent Document 2: 3GPP TSG-RAN Meeting #62 RP-131701 (2013-12)

SUMMARY OF THE INVENTION

Problem to be Solved by the Invention

Next, a configuration of C-RAN discussed in 5G will be described. In FIG. 2, a 4G-DU and a 4G-RU mean a DU and a RU having the LTE-A functions (including the LTE functions). Moreover, a 5G-DU and a 5G-RU mean a DU and a RU having the functions of 5G radio techniques. The 4G-DU and the 5G-DU are connected by an interface which expands the interfaces X2-AP and X2-U in the LTE. Moreover, a network line that connects a DU and a RU is referred to as a FH (Front Haul), and in the LTE, a CPRI (Common Public Radio Interface) is used in the FH.

Here, 3GPP has discussed to enable a portion of the layers implemented on the DU to be realized on the RU to reduce the amount of information transmitted by the FH. Various variations are conceivable as to determining a layer of which the functions are to be realized on the RU. As an example, a method in which all or a portion of the functions of layer 1 included in the DU is realized by the RU and a method in which portions of Layer 1 and Layer 2 are realized on the RU are discussed.

LAA needs to have a function of detecting a use state of a specific band such as the unlicensed band so that no interference or the like with another radio system that performs communication using the specific band occurs. When LAA is realized in a C-RAN that includes a DU and a RU, the detection function required for the LAA needs to be realized by the RU. However, in the current 3GPP, a specification for realizing the function required for the LAA on the RU is not defined.

The disclosed technique has been made in view of the above-described circumstance, and an object thereof is to provide a technique capable of detecting a use state of a specific band in a C-RAN wireless communication network.

Means for Solving Problem

A base station of the disclosed technique is a base station used as a first base station in a wireless communication system including the first base station, a second base station that communicates with the first base station, and a user equipment that communicates with the first base station, the base station including: a reception unit that receives a parameter used for performing communication in a specific band and data to be transmitted toward the user equipment from the second base station; and a detection unit that performs a process of detecting a use state of the specific band according to the parameter when the data is transmitted to the user equipment.

Effect of the Invention

According to the disclosed technique, a technique capable of detecting a use state of a specific band in a C-RAN wireless communication network is provided.

BRIEF DESCRIPTION OF DRAWINGS

FIG. 6 is a diagram illustrating a first example of a processing procedure that the wireless communication system according to the embodiment performs;
FIG. 7 is a diagram illustrating an example of LAA processing parameters;
FIG. 8 is a diagram illustrating an example of feedback information;

FIG. 9 is a diagram illustrating a second example of a processing procedure that the wireless communication system according to the embodiment performs;

FIG. 10 is a diagram illustrating an example of LAA processing parameters;

FIG. 11 is a diagram illustrating an example of feedback information;

FIG. 13 is a diagram illustrating an example of LAA processing parameters;

FIG. 14 is a diagram illustrating an example of a measurement result report;

MODE(S) FOR CARRYING OUT THE INVENTION

Figure 1:
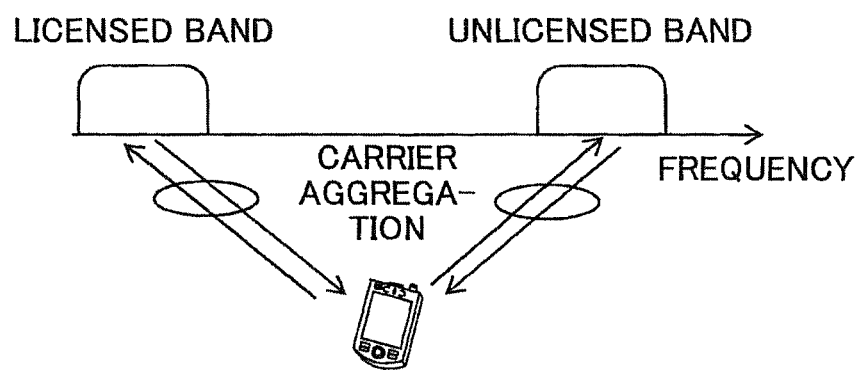
FIG. 1 is a diagram illustrating an overview of LAA discussed in Rel.13.
Figure 2:
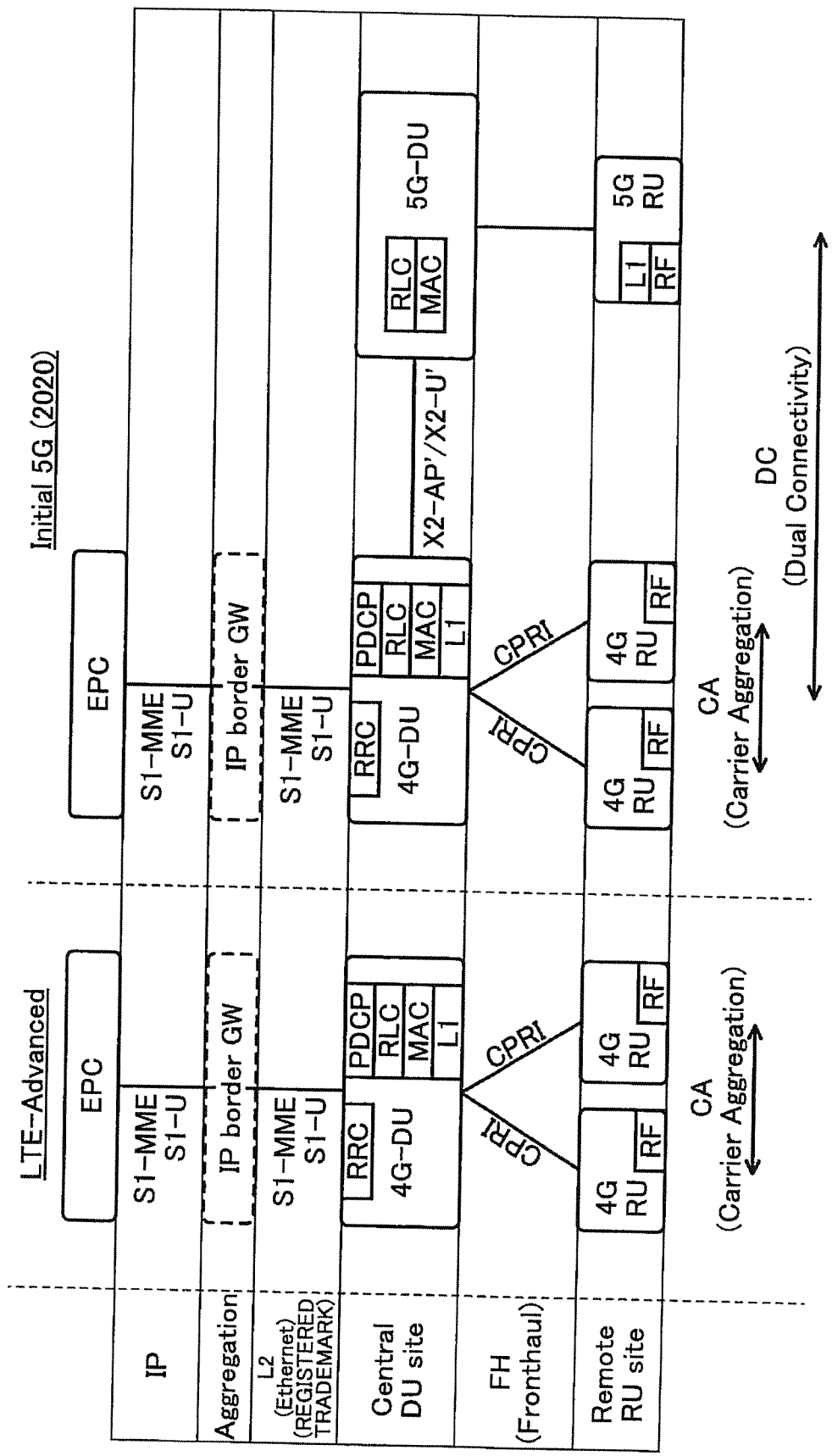
FIG. 2 is a diagram illustrating a configuration example of a C-RAN discussed in 5G.

Hereinafter, an embodiment of the invention will be described with reference to the drawings. The embodiment to be described below is an example only, and an embodiment to which the invention is applied is not limited to the following embodiment. For example, although a wireless communication system according to the present embodiment is a system of a scheme compatible with LTE, the invention is not limited to LTE but can be applied to other schemes. In the present specification and the claims, "LTE" is used in a broad sense to include 5G communication schemes corresponding to 3GPP release 10, 11, 12, 13, 14, or later as well as communication schemes corresponding to 3GPP release 8 or 9 unless otherwise stated particularly.

In the following description, 1TTI is used to mean a minimum unit of scheduling. Moreover, although one subframe is used assuming that it has the same length as 1TTI, the subframe is not intended to be limited thereto but may be replaced with other units.

"Layer 1" and "physical layer" have the same meaning. Moreover, Layer 2 includes a MAC (Medium Access Control) sublayer, a RLC (Radio Link Control) sublayer, and a PDCP (Packet Data Convergence Protocol) sublayer. Furthermore, Layer 3 includes a RRC (Radio Resource Control) layer.

In the following description, although a frequency carrier to which LBT is not set is described as a licensed band and a frequency carrier to which LBT is set is described as an unlicensed band, the invention is not limited to this. That is, in the present embodiment, the invention can be applied regardless of a licensed band or an unlicensed band as long as the band is a specific band to which LBT is set.

<LAA>

(Overview of LAA)

First, LAA which is discussed in 3GPP will be described. In the unlicensed band, an interference control function is required since LTE systems of other business operators, Wi-Fi (registered trademark) systems, or the other systems coexist. A function called LBT (Listen Before Talk) or CCA (Clear-Channel Assessment) is implemented as an interference control function at the same frequency. In Japan, Europe, and other countries, it is defined that the LBT function is essential in a Wi-Fi (registered trademark) system which is operated in an unlicensed band of 5 GHz.

A user equipment that performs communication using an unlicensed band frequency range (the spectrum may be referred to as a frequency, a channel, or a carrier) is inhibited from transmitting signals in the band frequency range when another entity (another user equipment or the like) which performs communication in the unlicensed band frequency range is detected. Due to this, the user equipment executes LBT at a timing a predetermined period before the transmission timing. The user equipment that executes LBT searches the entire frequency range of the target unlicensed band at the timing a predetermined period before the transmission timing to check whether another device (a base station, a LAA-UE, a Wi-Fi (registered trademark) device, or the like) is communicating in the frequency range of the band. The user equipment performs transmission using the band as long as it is confirmed that the other device is not performing communication. On the other hand, when another device which uses a partial range of the band is detected (that is, when it is detected that the reception power of a signal associated with the range, from another device exceeds a threshold), the user equipment stops its transmission. Here, when the reception power in the LBT period is higher than a predetermined threshold, the unlicensed band frequency range is regarded to be in a busy state (Busy). When the reception power in the LBT period is lower than a predetermined threshold, the unlicensed band frequency range is regarded to be in an idle state (Idle).

(Lbt Process)

Figure 3:
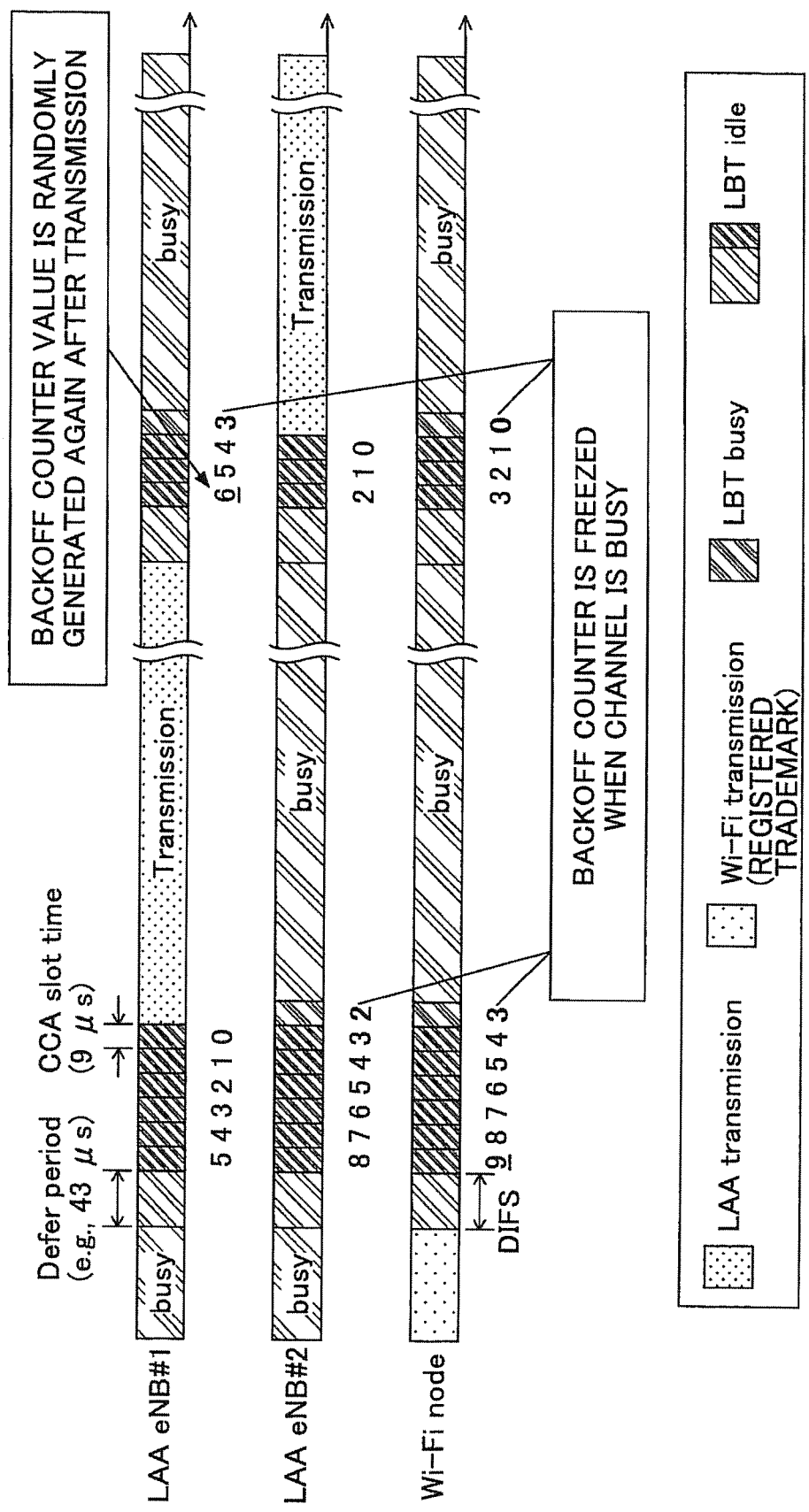
FIG. 3 is a diagram for describing a specific operation of LBT.

FIG. 3 is a diagram for describing a specific operation of the LBT. Before transmitting data, a user equipment checks whether the unlicensed band frequency range is in the idle state (Idle) continuously between a Defer Period (for example, 43 μs, corresponding to DIFS in Wi-Fi (registered trademark)) and a backoff period. The backoff period is a period obtained by multiplying a backoff counter value determined randomly by the user equipment itself and a CCA (Clear Channel Assessment) slot time (CCA slot time (for example, 9 μs) in FIG. 3). The user equipment compares the reception power with a predetermined threshold every CCA slot time, regards that the unlicensed band frequency range is in the idle state when the reception power is lower than the predetermined threshold, subtracts the backoff counter value, and starts data transmission at a timing at which the backoff counter value reaches zero. Comparing the reception power and the predetermined threshold every CA slot time is referred to as "carrier sense". The example of FIG. 3 illustrates a state in which the backoff counter value of LAA eNB#1 is "5" and data transmission starts at a timing at which the counter value is subtracted to reach "0". Similarly, the example of FIG. 3 illustrates a state in which the backoff counter value of LAA eNB#2 is "8" and data transmission starts at a timing at which the counter value is subtracted to reach "0". As illustrated in FIG. 3, when the busy state is detected before the backoff counter value reaches zero, the backoff counter value is freezed until a subsequent idle state is detected.

<System Configuration>

Figure 4:
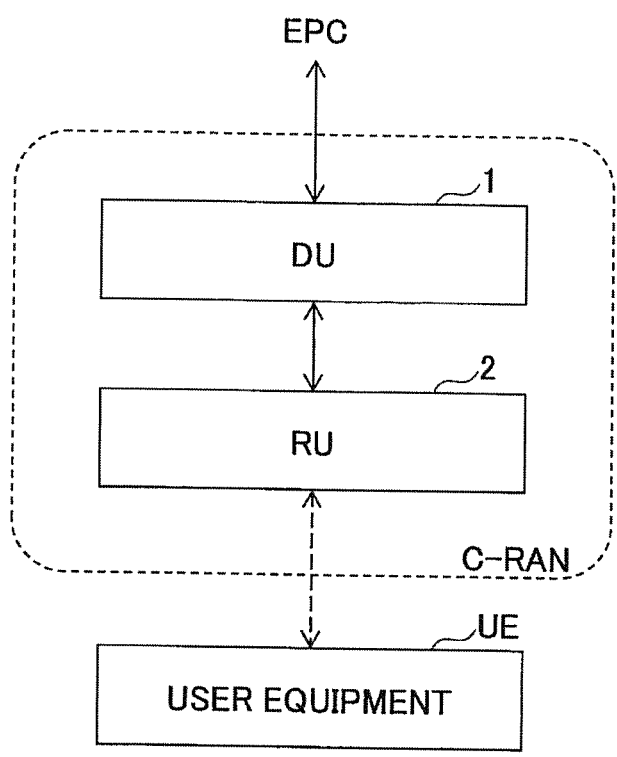
FIG. 4 is a diagram illustrating a system configuration example of a wireless communication system according to an embodiment.

FIG. 4 is a diagram illustrating a system configuration example of a wireless communication system according to an embodiment. As illustrated in FIG. 4, the wireless communication system according to the present embodiment includes a DU 1, a RU 2, and a user equipment UE. In FIG. 4, although one RU 2 is illustrated, two or more RUs 2 may be included. That is, the DU 1 may be configured to control a plurality of RUs 2.

The DU 1 may be referred to as a central digital unit and may be referred to as a base band unit (BBU). Moreover, the DU 1 may be referred to as a central base station and may be referred to simply as a base station (eNB: enhanced Node B).

The RU 2 may be referred to as a remote radio unit (RRU) and may be referred to as a RRA (Remote Antenna Unit), and may be referred to as a RRH (Remote Radio Head). Moreover, the RU 2 may be referred to as a remote base station and may be referred to simply as a base station. The DU 1 and the RU 2 are connected by the FH and perform communication using a protocol used by the FH.

The wireless communication system according to the present embodiment has a function of performing communication using at least one or more unlicensed bands, and the RU 2 forms at least one or more cells in the unlicensed band. Moreover, the wireless communication system according to the present embodiment may be configured to be able to execute carrier aggregation (CA) including cells in the unlicensed band and may be configured to perform communication in the unlicensed band only.

<Sharing of Functions Between DU and RU>

Figure 5:
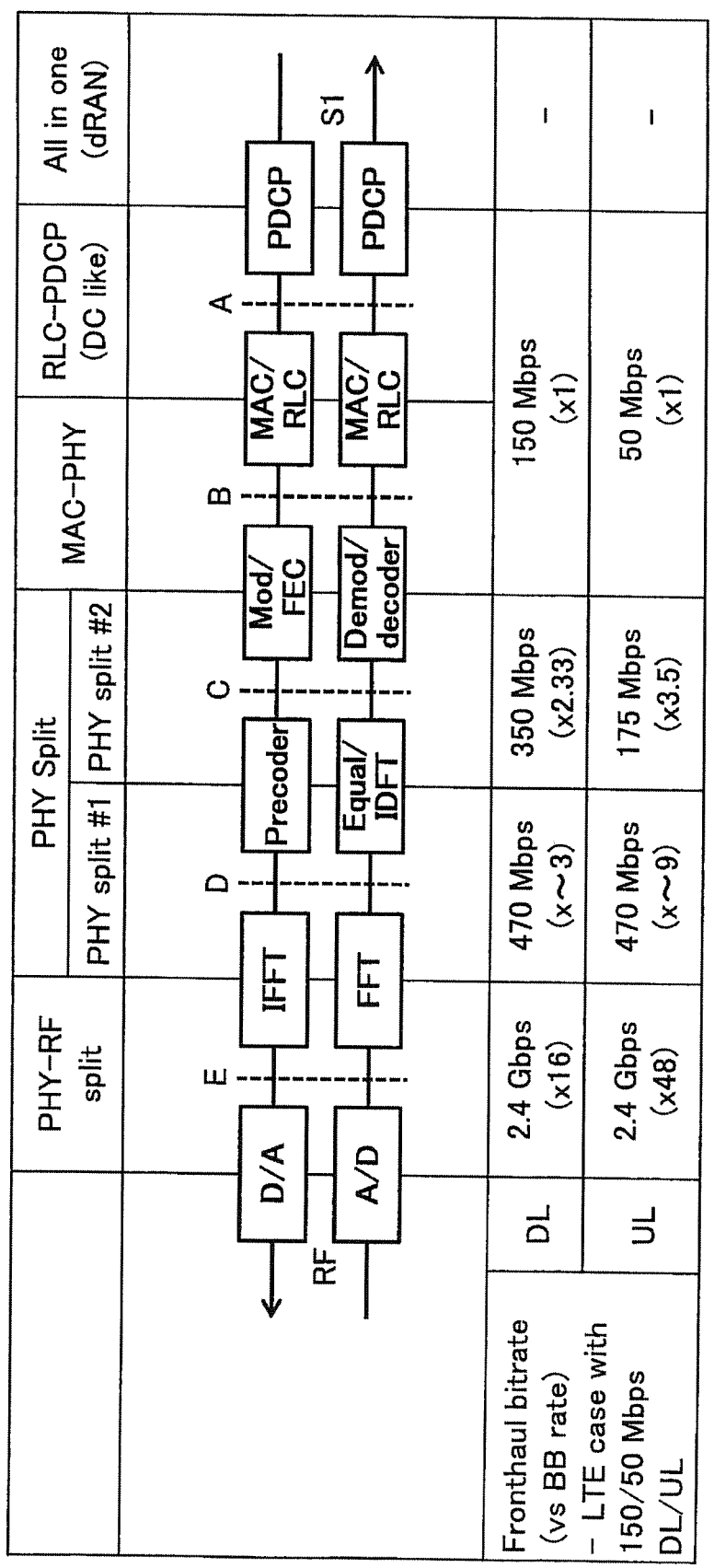
FIG. 5 is a diagram for describing an example of how the functions of a DU and a RU are shared.

FIG. 5 is a diagram for describing an example of how the functions of the DU and the RU are shared. The boundaries "A" to "E" in FIG. 5 indicate the boundaries between the functions implemented in the DU 1 and the RU 2. For example, when functions are shared based on the boundary "B," it means that the functions of Layers 2 and higher are implemented on the DU 1 side and the functions of Layer 1 are implemented on the RU2 side. When functions are shared based on the boundary "E," it corresponds to a configuration in which the functions of Layers 1 and higher are implemented on the DU 1 side and the DU 1 and the RU 2 are connected using the CPRI.

FIG. 5 also illustrates an example of bit rates required for the FH for each boundary. For example, it is assumed that the DU 1 supports 150 Mbps (DL) and 50 Mbps (UL). In this case, when functions are shared based on the boundary "A" or "B," the band required for the FH is 150 Mbps (DL) and 50 Mbps (UL). The wireless communication system according to the present embodiment may be configured to support sharing of functions based on any one of the boundaries "A" to "E" and may be configured to support sharing of functions based on different boundaries for UL and DL.

<Processing Procedure>

(First Processing Procedure)

FIG. 6 is a sequence diagram illustrating a first processing procedure that the wireless communication system according to the embodiment performs. A processing procedure when the DU 1 transmits data to the user equipment UE via the RU 2 will be described with reference to FIG. 6.

The DU 1 transmits data to be transmitted to the user equipment UE to the RU 2 in correlation with various parameters (hereinafter referred to as "LAA processing parameters") to be used for performing various operation of the LAA when transmitting the data (S11). A specific example of the LAA processing parameter will be described later.

Subsequently, the RU 2 performs a LBT process according to the LAA processing parameter transmitted from the DU 1 (S12) and performs data transmission when it is determined that data transmission can be performed (S13). Subsequently, the RU 2 transmits feedback information indicating a data transmission result (whether data can be transmitted or not) to the DU 1. A specific example of the feedback information will be described.

The processing procedures of steps S11 to S14 are repeatedly performed at a timing at which data (for example, data in TB units) to be transmitted toward the user equipment UE is generated. Moreover, the DU 1 can send the LAA processing parameter to the RU 2 while arbitrarily changing the LAA processing parameter for each user equipment UE or for each type of the plurality of items of data to be transmitted to the user equipment UE. That is, when there is a plurality of user equipments UEs that performs communication using the unlicensed band, the DU 1 can designate different LAA processing parameters for respective user equipments UEs. Moreover, when data of different types (VoIP, a best effort packet, and the like) are transmitted simultaneously to the same user equipment UE, the DU 1 can designate different LAA processing parameters for respective types of data.

[LAA Processing Parameter]

FIG. 7 is a diagram illustrating an example of the LAA processing parameter. As illustrated in FIG. 7, the LAA processing parameter roughly includes two types of information. The first type of information is information (LBT-related information) related to the LBT process, and includes the necessity of LBT execution, a backoff time, and carrier sense time, for example. The second type of information is information (transmission-related information) used when transmitting data in the unlicensed band, and includes a largest successive transmission time, transmission power, an unlicensed band frequency range, a data transmission starting symbol position, a data transmission ending symbol position, and a data transmission limit time.

The "necessity of LBT execution" is information indicating whether LBT is to be executed by the RU 2. When it is instructed that LBT is not to be executed, the RU 2 transmits data without performing the LBT process.

The "largest backoff time" is information indicating a largest value of the backoff time to be used when the RU 2 performs the LBT process. When determining the backoff counter value randomly, the RU 2 determines the backoff counter value within a range where the value does not exceed the "largest backoff time". The LAA processing parameter may store a "largest backoff counter value" instead of the "largest backoff time". Moreover, the LAA processing parameter may store information that specifically designates the backoff time or the backoff counter value to be applied to the RU 2 instead of the "largest backoff time" or the "largest backoff counter value". In this case, the RU 2 performs the LBT process using the designated backoff time or the designated backoff counter value rather than determining the backoff counter value randomly.

The "carrier sense time" is information indicating a carrier sense time per instance and has the same meaning as the CCA slot time. The "carrier sense time" may include information indicating Defer Period in addition to the carrier sense time per instance. The DU 1 can control the transmission latency according to the data type by switching the "carrier sense time" according to the type (VoIP, a best effort packet, and the like) of data. For example, the DU 1 may perform control so that the "carrier sense time" is decreased for VoIP so that the transmission latency is reduced as much as possible.

The "largest successive transmission time" is information indicating a largest time in which a wireless system which uses the unlicensed band can transmit radio signals successively. In LAA, since a plurality of wireless systems shares the same frequency range, if a specific device transmits radio signals successively for a long period, the other wireless systems cannot obtain a chance to transmit data in that period. Thus, LAA defines a largest successive transmission time so that successive transmission of radio signals for a predetermined period or longer is inhibited. In the frequency range of the wireless LAN in Japan, it is defined that the "largest successive transmission time" is 4 ms. The DU 1 can control the largest successive transmission time according to the data type by switching the "largest successive transmission time" according to the type (VoIP, a best effort packet, and the like) of data. For example, the DU 1 may perform control so that the "largest successive transmission time" as well as the "carrier sense time" is decreased for VoIP so that the VoIP packet of which the "carrier sense time" is set to be short does not occupy the frequency range for a long period.

The "transmission power" is information indicating transmission power used when the RU 2 performs data transmission. The "transmission power" may be information that specifically indicates the transmission power and may be information indicating largest transmission power.

The "unlicensed band frequency range" is information indicating the frequency and the range of the unlicensed band that the RU 2 has to use for data transmission. The RU 2 performs the LBT process on the frequency range designated by the "unlicensed band frequency range" and performs data transmission. For example, when CA including two unlicensed bands is set to the user equipment UE according to the present embodiment, the RU 2 performs the LBT process on the frequency range designated by the "unlicensed band frequency range" and transmits data.

The "data transmission starting symbol position" is information indicating a symbol position of a subframe in the licensed band, from which data transmission has to start when data transmission starts in the frequency range of the unlicensed band. As described above, in LAA Rel.13, although CA is performed using the licensed band and the unlicensed band, data is transmitted in units of subframes in the licensed band. On the other hand, various timings and periods in the unlicensed band are independent from the timings of subframes in the licensed band. However, from the perspective of signal processing in the user equipment UE, it is preferable that the user equipment UE can receive the radio signals in the unlicensed band at the same timing as the licensed band. Therefore, the RU 2 starts transmitting data to be transmitted to the user equipment UE at the timing designated by the "data transmission starting symbol position" rather than starting transmitting data to be transmitted to the user equipment UE immediately at the timing at which the backoff counter value reaches zero when data is transmitted in the frequency range of the unlicensed band.

As the "data transmission starting symbol position," LTE Rel.13 defines the two timings, subframe staring timing and slot starting timing, and the timing can be configured in advance to the user equipment UE using the RRC signal or the like within the range of the capability of the user equipment UE. Therefore, the DU 1 may designate any one of the subframe starting timing and the slot staring timing as the "data transmission starting symbol position" within the range of the capability of the user equipment UE as in the LTE Rel.13. The invention is not limited to this, but the DU 1 may designate an arbitrary symbol position within the range of the capability of the user equipment UE. The RU 2 transmits arbitrary radio signals since a data transmission chance is not given to other wireless systems (the busy state is detected in the other wireless systems) in a period between the timing at which the backoff counter value reaches zero and the timing designated by the "data transmission starting symbol position".

The "data transmission ending symbol position" is information indicating a symbol position in a subframe of the licensed band, at which data transmission has to end when the RU 2 ends transmitting data in the frequency range of the unlicensed band. The DU 1 may designate any one of the subframe starting timing and the slot starting timing as the "data transmission ending symbol position" within the range of the capability of the user equipment UE. The invention is not limited to this, but the DU 1 may designate an arbitrary symbol position within the range of the capability of the user equipment UE. As described above, the RU 2 cannot transmit radio signals in a period exceeding the period designated by the "largest successive transmission time". Therefore, the RU 2 ends transmitting data to be transmitted toward the user equipment UE at a timing satisfying the "data transmission ending symbol position" and within the period designated by the "largest successive transmission time".

While the LAA processing parameters have been described, this is an example only, and not all of the necessity of LBT execution, the backoff time, the carrier sense time, the largest successive transmission time, the transmission power, the unlicensed band, the data transmission starting symbol position, and the data transmission ending symbol position, and the data transmission limit time. For example, some of the LAA processing parameters may be defined in advance as standard specifications.

[Feedback Information]

FIG. 8 is a diagram illustrating an example of the feedback information. As illustrated in FIG. 8, the LAA processing parameters include data transmittability and LBT setting information.

The "data transmittability" is information indicating whether data transmission could be completed until a predetermined period elapses after the RU 2 receives data to be transmitted to the user equipment UE from the DU 1. In LAA, since it is not possible to transmit data unless a transmission chance is obtained, the fact that data could not be transmitted is reported from the RU 2 to the DU 1. In this way, the report can be used for a subsequent scheduling process in such a way that the DU 1 can understand a congestion state of the unlicensed band and can instruct the RU 2 to transmit data in the other unlicensed band. The predetermined period may be defined in advance in the standard specifications or the like as information indicating the largest standby period when data is transmitted and may be included in the LAA processing parameter.

The "LBT setting information" indicates setting information used for the LBT process, and stores the "backoff time" (or the "backoff counter value") selected randomly by the RU 2, for example. When it is determined that data transmission could not be completed within a predetermined period, the RU 2 may store the backoff counter value of that time point in addition to the randomly selected "backoff time" (or the "backoff counter value") in the "LBT setting information". When the backoff counter value is decreased by a small amount, the DU 1 can determine that the unlicensed band is congested and can use this congestion information in a subsequent scheduling process.

While the feedback information has been described, this is an example only, and only one of the data transmittability and the LBT setting information may be stored.

[Supplementary Explanation of First Processing Procedure]

When the result of the LBT process shows that data could not be transmitted within a predetermined period, the RU 2 may store the data in the memory or the like of the RU 2 and may transmit the data in a subsequent transmission timing.

More specifically, for example, the RU 2 may complete data transmission by performing the LBT process again (or repeatedly) using the LAA processing parameter received simultaneously with the data which could not be transmitted. In this case, when a data transmission method (a transmission resource, a modulation scheme, and the like) is instructed from the DU 1 together with the LAA processing parameter, the RU 2 may complete the data transmission using the instructed transmission method as it is.

When it is determined that data could not be transmitted within a predetermined period, the RU 2 may set the fact to the "data transmittability" of the feedback information and feed the same back to the DU 1, and the DU 1 may transmit the LAA processing parameter (or the LAA processing parameter and the data transmission method") only to be used for retransmission (retry) of data to the RU 2 in order to perform retransmission (retry) of the data which could not be transmitted. The RU 2 tries the retransmission (retry) of the data stored in the RU 2 itself according to the received LAA processing parameter (or the LAA processing parameter and the data transmission method).

When the result of the LBT process shows that data could not be transmitted within a predetermined period, the RU 2 may discard the data. More specifically, for example, when it is determined that data transmission could not be completed within a predetermined period, the RU 2 sets the fact to the "data transmittability" of the feedback information, feed the same back to the DU 1, and discard the data, and the DU 1 may transmit the LAA processing parameter (or the LAA processing parameter and the data transmission method) to be used for retransmission (retry) of the data and the data to be retransmitted to the RU 2 in order to perform retransmission (retry) of the data which could not be transmitted.

When the result of the LBT process shows that data could not be transmitted within a predetermined period, the RU 2 may instruct the DU 1 to discard the data and stop subsequent transmission of data. More specifically, for example, when it is determined that data could not be transmitted within a predetermined period, the RU 2 may set the fact to the "data transmittability" of the feedback information and feed the same back to the DU 1, and the DU 1 may instruct the RU 2 to do not perform subsequent transmission of data. In this case, the RU 2 may predict a subsequent timing at which data could be transmitted and transmit the timing to the DU 1 by inserting the same in the feedback information. The RU 2 may predict the subsequent timing at which data could be transmitted by multiplying the backoff counter value at the time point at which it was determined that data transmission could not be completed with a CCA slot time. Moreover, the RU 2 may transmit a use state (the type of other wireless system, the usage of radio resources, and the like) of the unlicensed band to the DU 1 by inserting the same in the feedback information.

(Second Processing Procedure)

FIG. 9 is a sequence diagram illustrating a second processing procedure that the wireless communication system according to the embodiment performs. A processing procedure when data is transmitted from the DU 1 to the user equipment UE via the RU 2 will be described with reference to FIG. 9.

In the second processing procedure, the LAA processing parameter to be used for the LAA process is instructed in advance to the RU 2 rather than transmitting the data to be transmitted to the user equipment UE and the LAA processing parameter to be applied to the transmission of the data to the RU 2 in correlation unlike the first processing procedure described in FIG. 6.

That is, the LAA processing parameter is dynamically instructed to the RU 2 for respective items of data to be transmitted to the user equipment UE in the first processing procedure whereas the LAA processing parameter is semi-statically instructed to the RU 2 in the second processing procedure. In this way, the second processing procedure can reduce the frequency range of the FH as compared to the first processing procedure. The other features which are not mentioned particularly may be the same as those of the first processing procedure.

The DU 1 transmits the LAA processing parameter in advance to the RU 2 (S21). Subsequently, the DU 1 transmits the data to be transmitted to the user equipment UE to the RU 2 (S22). Subsequently, the RU 2 performs the LBT process according to the LAA processing parameter transmitted from the DU 1 (S23) and performs data transmission when it is determined that data transmission can be performed (S24). Subsequently, the RU 2 transmits feedback information indicating a data transmission result (whether data could be transmitted or not) to the DU 1.

The processing procedures of steps S22 to S25 are repeatedly performed at a timing at which data (for example, data in TB units) to be transmitted toward the user equipment UE is generated.

[Supplementary Explanation of Second Processing Procedure]

In a second processing procedure, all or some of the LAA processing parameters may be correlated with a barrier type (DRB, SRB, or the like), a barrier identifier (SRB/DRB identity or the like), a logical channel identifier (LCID: Logical Channel ID), LCG (Logical Channel Group), or a traffic type. In the processing procedure of step S22, the DU 1 may report (transmit) a barrier type, a barrier identifier, a logical channel identifier, or a traffic type corresponding to the data to be transmitted to the user equipment UE to the RU 2. The RU 2 may performs a LBT process and a data transmission process using the LAA processing parameter corresponding to the reported (transmitted) barrier type, barrier identifier, logical channel identifier, or traffic type.

(Information on Other Wireless System which Uses Unlicensed Band)

While the first and second processing procedures have been described, the DU 1 may transmit information (hereinafter referred to as "surrounding wireless system information" on the other wireless system which uses the unlicensed band to the RU 2 by inserting the same to the LAA processing parameter as illustrated in FIG. 10.

The surrounding wireless system information stores information indicating that "a wireless system of a wireless LAN is present" and "a wireless system of a wireless LAN is not present but a wireless system that performs LAA only is present" in the unlicensed band (that is, the unlicensed band designated by the "unlicensed band frequency range" of the LAA processing parameter) in which the RU 2 performs the LBT process, for example. The RU 2 may appropriately change the LBT process based on the information stored in the surrounding wireless system information. For example, when the information indicating that "the wireless system of the wireless LAN is not present but the wireless system that performs LAA only is present" is stored in the surrounding wireless system information, the RU 2 may perform the LBT process by alleviating the setting value (for example, by downscaling the largest backoff time to $\frac{1}{2}$) rather than performing the LBT process according to the setting value itself corresponding to the LBT-related information set to the LAA processing parameter.

The RU 2 may collect information on the other wireless system which uses the unlicensed band when performing the LBT process. Moreover, as illustrated in FIG. 11, the RU 2 may report (transmit) the collected information (the surrounding wireless system information) to the DU 1 by inserting the same to the feedback information. The DU 1 can perform an operation of changing the LAA processing parameter based on a predetermined logic according to the reported (transmitted) surrounding wireless system information.

(Measurement and Report of Reception Strength)

In the wireless communication system according to the present embodiment, the RU 2 may measure the reception strength of the radio signals transmitted in the unlicensed band in the first and second processing procedures.

Figure 12:
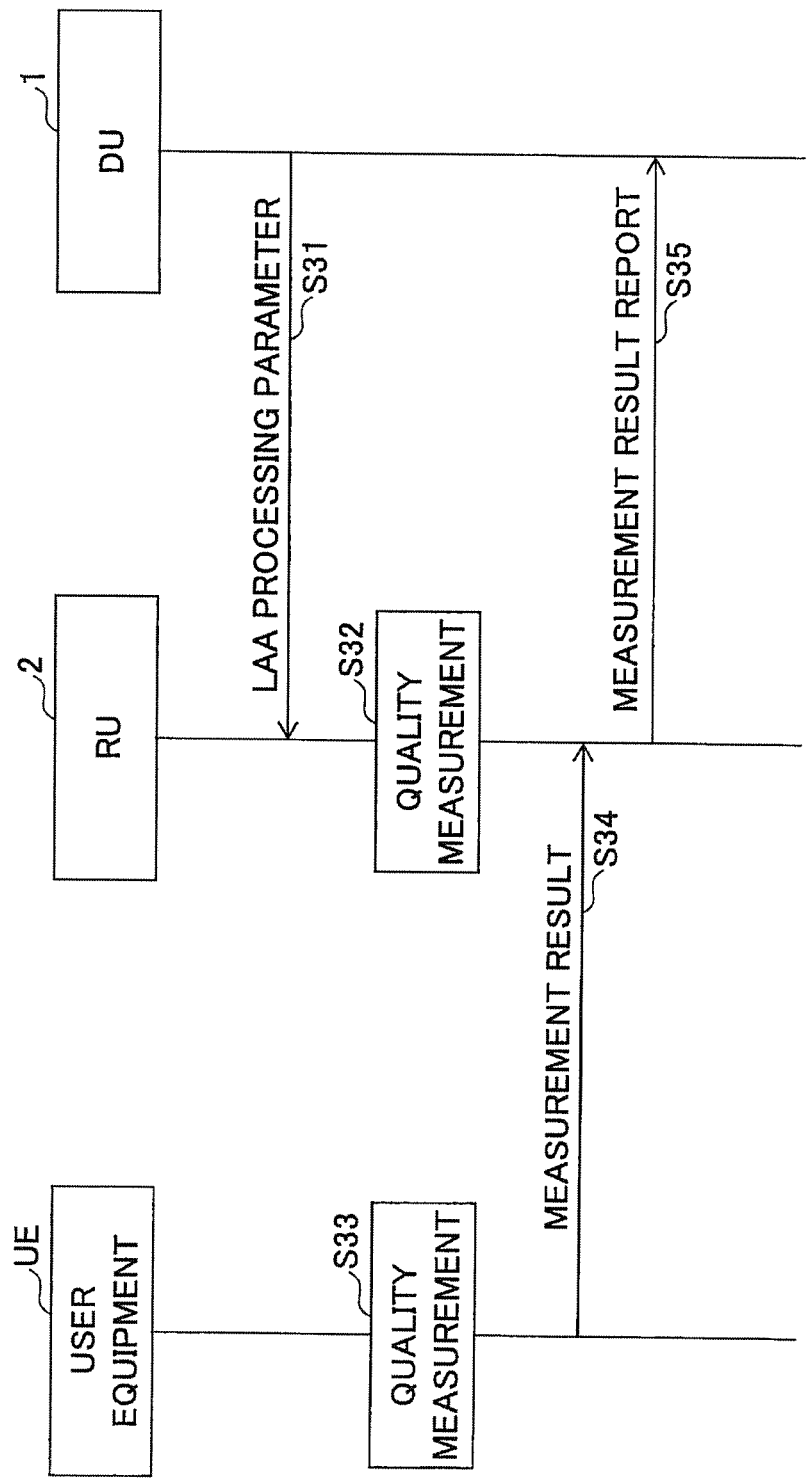
FIG. 12 is a sequence diagram when the wireless communication system according to the embodiment measures reception strength.

FIG. 12 is a sequence diagram when the wireless communication system according to the present embodiment measures the reception strength. First, the DU 1 transmits the LAA processing parameter to the RU 2 (S31). The processing procedure of step S31 corresponds to the processing procedure of step S11 in FIG. 6 or step S21 of FIG. 9. As illustrated in FIG. 13, "UE measurement setting information" is included in the LAA processing parameter. The "UE measurement setting information" is the same measurement setting information as the measurement setting information (corresponding to the Measurement configuration in the conventional LTE) reported (transmitted) to the user equipment UE on the higher layer (RRC or the like) in order to measure the unlicensed band. That is, the RU 2 performs the same measurement process as the measurement that the user equipment UE performs.

Subsequently, the RU 2 measures the reception strength (RSSI: Reference Signal Strength Indicator) of the radio signals transmitted from the other wireless signal in the unlicensed band according to the "UE measurement setting information" reported (transmitted) in step S31 (S32). Similarly, the user equipment UE measures the reception strength of the radio signals transmitted from the other wireless system in the unlicensed band according to the measurement setting information reported (transmitted) in advance on the higher layer (S33) and reports the measurement result to the RU 2 (S34).

Subsequently, the RU 2 transmits a measurement result report including the measurement result measured in the processing procedure of step S32 and the measurement result reported (transmitted) from the user equipment UE in the processing procedure of step S34 to the DU 1. The RU 2 may transmit the measurement result report to the DU 1 by inserting the same in the feedback information.

FIG. 14 is a diagram illustrating an example of the measurement result report. As illustrated in FIG. 14, the measurement result report reported from the RU 2 to the DU 1 includes a "reference signal transmission result," a "RU measurement result," and a "UE measurement result".

The "reference signal transmission result" is information indicating whether a reference signal (for example, CRS (Cell Specific Reference Signal), DRS (Discovery Reference Signal), or the like) could be mapped to a portion of a radio resource to which data is mapped when the RU 2 transmits data to the user equipment UE in the processing procedure of step S13 in FIG. 6 or step S24 in FIG. 9. Since it is expected that a case in which the RU 2 could not transmit the reference signal only does not occur easily, the "reference signal transmission result" may not necessarily be included in the measurement result report.

In the processing procedure of step S34, the user equipment UE may transmit the measurement result to the RU 2 using the signal (for example, a uplink physical control channel) of Layer 1 and may transmit the same to the RU 2 using the signal of Layer 2 or 3. When the measurement result is transmitted using the signal of Layer 2 or 3, since the RU 2 cannot recognize the measurement result (since the RU 2 does not have the processing function of layers other than Layer 1), the "UE quality measurement result" is not set to the measurement result report transmitted from the RU 2 to the DU 1. In this case, the measurement result transmitted from the user equipment UE is reported to the DU 1 as it is via the RU 2 (while tunneling through the RU 2).

When the RU 2 performs the same process as the quality measurement performed by the user equipment UE, the DU 1 or/and the RU 2 can detect the presence of a hidden terminal or the like, for example. More specifically, for example, when the value of the reception strength measured by the user equipment UE at a certain timing is larger than the value of the reception strength measured by the RU 2, the DU 1 or/and the RU 2 can understand that a wireless system that is transmitting radio signals is present at a position invisible from the RU 2. In other words, since the radio signals transmitted from the hidden terminal do not arrive in the RU 2, the DU 1 or/and the RU 2 can understand that there is a possibility that the RU 2 could not perform the LBT process properly. In this way, the DU 1 or the RU 2 can perform data transmission selectively using the licensed band or the unlicensed band, for example, and it is possible to improve the quality of communication between the user equipment UE and the RU 2.

<Functional Configuration>

(DU)

Figure 15:
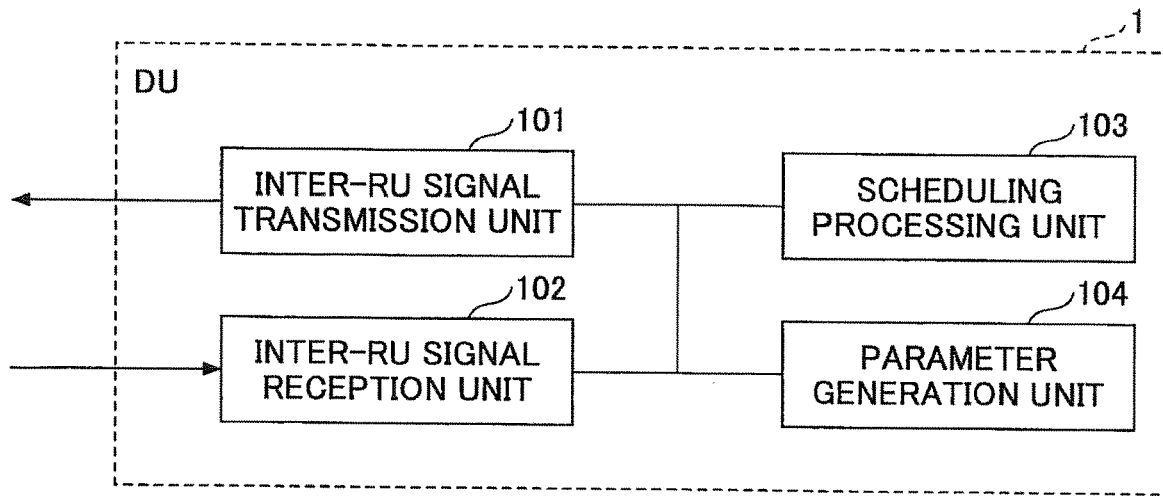
FIG. 15 is a diagram illustrating a functional configuration example of a DU according to the embodiment.

FIG. 15 is a diagram illustrating a functional configuration example of a DU according to the embodiment. As illustrated in FIG. 15, the DU 1 includes an inter-RU signal transmission unit 101, an inter-RU signal reception unit 102, a scheduling processing unit 103, and a parameter generation unit 104. FIG. 15 illustrates functional units of the DU 1 particularly related to the embodiment only and also includes at least functions (not illustrated) for performing operations compatible with LTE (including 5G). Moreover, the functional configurations illustrated in FIG. 15 are examples only. The functional classifications and the names of the functional units are not particularly limited as long as the operations according to the present embodiment can be executed. However, the functional configurations may be able to execute some (for example, specific one or plural modifications, specific examples, and the like) of the processes of the DU 1 described above.

The inter-RU signal transmission unit 101 includes a function of generating signals by performing the processes of each layer on the data to be transmitted from the DU 1 and transmitting the generated signals to the RU 2 via the FH. The inter-RU signal reception unit 102 includes a function of receiving signals from the RU 2 via the FH and acquiring data by performing the processes of each layer on the received signals. The inter-RU signal transmission unit 101 and the inter-RU signal reception unit 102 include the function of an interface of a predetermined protocol used by the FH.

The scheduling processing unit 103 determines whether data to be transmitted to the user equipment UE is to be transmitted in a unlicensed band and instructs the parameter generation unit 104 to generate the LAA processing parameter when it is determined that the data is to be transmitted in the unlicensed band. Moreover, the scheduling processing unit 103 instructs the inter-RU signal transmission unit 101 to transmit the data to be transmitted to the user equipment UE and the LAA processing parameter generated by the parameter generation unit 104 to the RU 2.

The parameter generation unit 104 has a function of generating the LAA processing parameter. The parameter generation unit 104 may generate the LAA processing parameter based on the feedback information reported (transmitted) from the RU 2. The scheduling processing unit 103 and the parameter generation unit 104 may be a portion of the functions of the MAC scheduler. Moreover, the parameter generation unit 104 may be included in the scheduling processing unit 103.

(RU)

Figure 16:
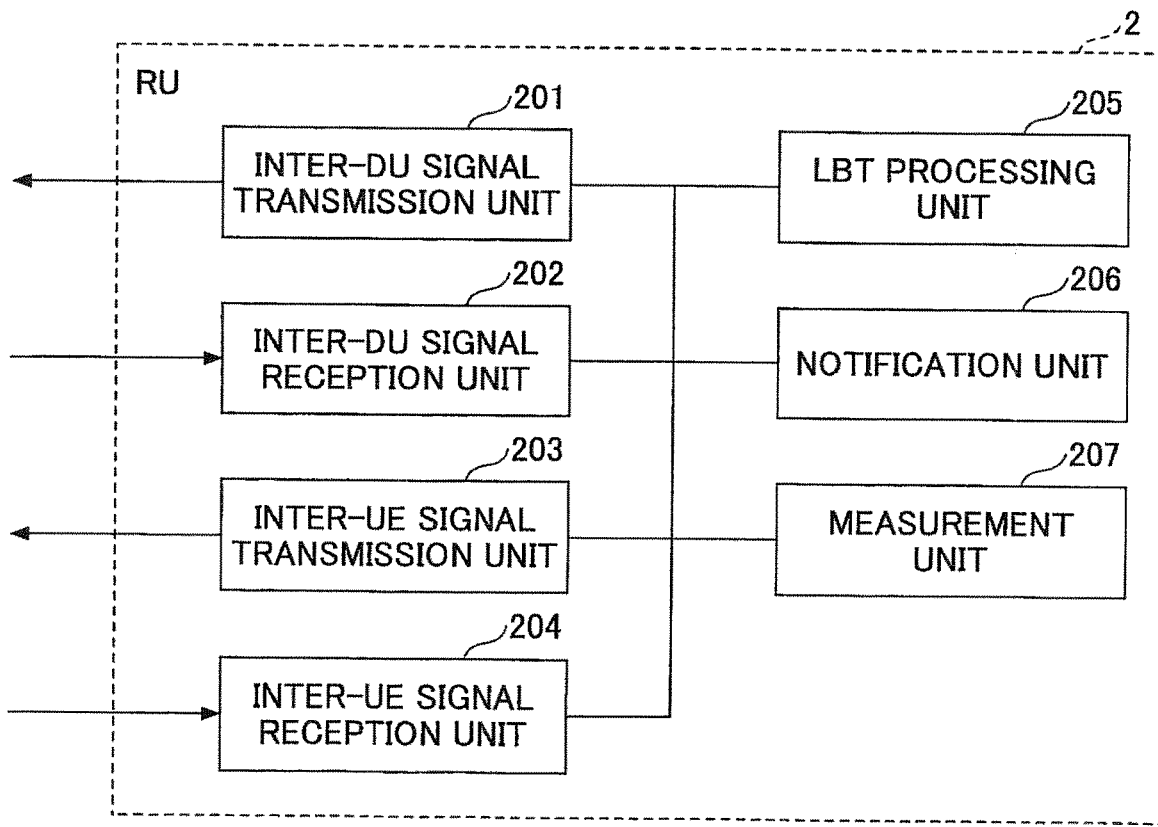
FIG. 16 is a diagram illustrating a functional configuration example of a RU according to the embodiment.

FIG. 16 is a diagram illustrating a functional configuration example of a RU according to the embodiment. As illustrated in FIG. 16, the RU 2 includes an inter-DU signal transmission unit 201, an inter-DU signal reception unit 202, an inter-UE signal transmission unit 203, an inter-UE signal reception unit 204, an LBT processing unit 205, a notification unit 206, and a measurement unit 207. FIG. 16 illustrates functional units of the RU 2 particularly related to the embodiment only and also includes at least functions (not illustrated) for performing operations compatible with LTE (including 5G). Moreover, the functional configurations illustrated in FIG. 16 are examples only. The functional category and the name of the functional unit are not particularly limited as long as the operations according to the present embodiment can be executed. However, the functional configurations may be able to execute some (for example, specific one or plural modifications, specific examples, and the like) of the processes of the RU 2 described above.

The inter-DU signal transmission unit 201 includes a function of transmitting signals to be transmitted to be transmitted to the DU 1 via the FH to the DU 1. The inter-DU signal reception unit 202 includes a function of receiving signals from the DU 1 via the FH. More specifically, the inter-DU signal reception unit 202 includes a function of receiving the LAA processing parameter and data to be transmitted to the user equipment UE from the DU 1. Moreover, the inter-DU signal transmission unit 201 and the inter-DU signal reception unit 202 include the function of an interface of a predetermined protocol used by the FH.

The inter-UE signal transmission unit 203 includes a function of transmitting the "data to be transmitted to the user equipment UE" received by the inter-DU signal reception unit 202 to the user equipment UE when it is determined that data transmission can be performed in the LBT process performed by the LBT processing unit 205. The inter-UE signal reception unit 204 receives the radio signals from the user equipment UE, performs predetermined processing of Layer 1 on the received radio signals, and delivers the processed radio signals to the inter-DU signal transmission unit 201.

The LBT processing unit 205 has a function of performing the LBT process according to the setting value of the LAA processing parameter when the data to be transmitted to the user equipment UE is transmitted to the user equipment UE via the inter-UE signal transmission unit 203. Moreover, the LBT processing unit 205 may collect information on a wireless system (a communication device) present in the unlicensed band and deliver the collected information to the notification unit 206.

The notification unit 206 has a function of reporting (transmitting) the feedback information (which may include a measurement result report) to the DU 1. Moreover, the notification unit 206 may report (transmit) the information on a wireless system (a communication device) present in the unlicensed band reported (transmitted) from the LBT processing unit 205 to the DU 1.

The measurement unit 207 has a function of measuring reception strength of the radio signals (the radio signals transmitted from a wireless system present in the unlicensed band) received by the RU 2 based on the measurement setting information. Moreover, the measurement unit 207 reports (transmits) the measured reception strength of the radio signals to the DU 2 via the inter-DU signal transmission unit 201 or the notification unit 206.

All of the functional configurations of the DU 1 and the RU 2 described above may be realized by a hardware circuit (for example, one or a plurality of IC chips), and portions thereof may be realized by a hardware circuit and the other may be realized by a CPU and a program.

(DU)

Figure 17:
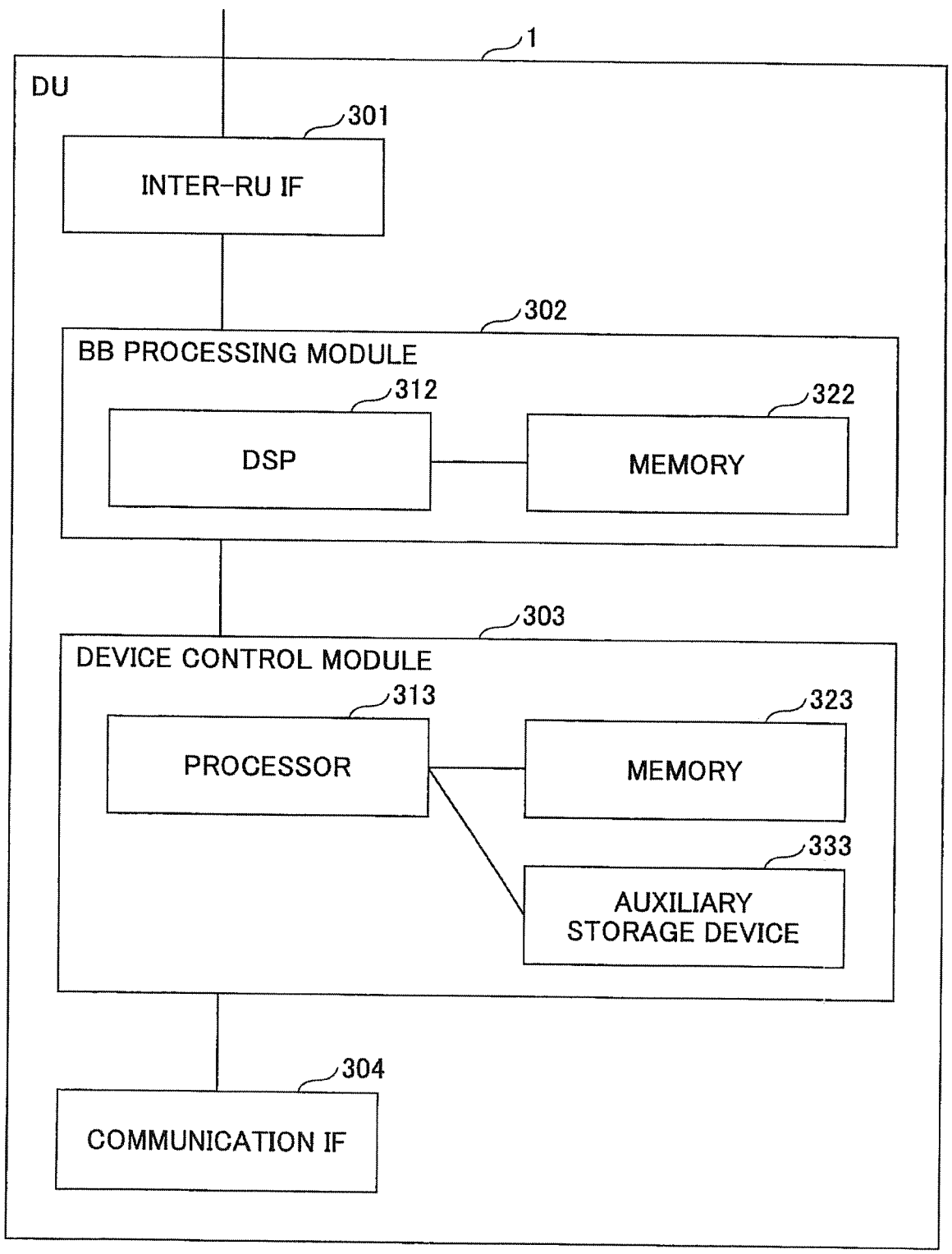
FIG. 17 is a diagram illustrating a hardware configuration example of a DU according to the embodiment.

FIG. 17 is a diagram illustrating a hardware configuration example of the DU according to the embodiment. FIG. 17 illustrates a configuration more similar to an implementation example than FIG. 15. As illustrated in FIG. 17, the DU 1 includes an inter-RU IF 301 which is an interface for connecting to the RU 2, a BB processing module 302 that performs baseband signal processing, a device control module 303 that performs processing of higher layers and the like, and a communication IF 304 which is an interface for connecting to a core network or the like.

The inter-RU IF 301 has a function of connecting a physical line of the FH that connects the DU 1 and the RU 2 and a function of terminating the protocol used by the FH. The inter-RU IF 301 includes a portion of the inter-RU signal reception unit 102 and the inter-RU signal transmission unit 101 illustrated in FIG. 15, for example.

The BB processing module 302 performs a process of converting an IP packet to signals transmitted and received to and from the RU 2 or vice versa. A DSP 312 is a processor that performs signal processing in the BB processing module 302. A memory 322 is used as a work area of the DSP 312. The BB processing module 302 includes the inter-RU signal transmission unit 101, a portion of the inter-RU signal reception unit 102, the scheduling processing unit 103, and the parameter generation unit 104 illustrated in FIG. 15, for example.

The device control module 303 performs protocol processing of the IP layer and OAM (Operation and Maintenance) processing. A processor 313 is a processor that performs the processing performed by the device control module 303. A memory 323 is used as a work area of the processor 313. An auxiliary storage device 333 is a HDD, for example, and stores various items of setting information for the base station eNB itself to operate.

(RU)

Figure 18:
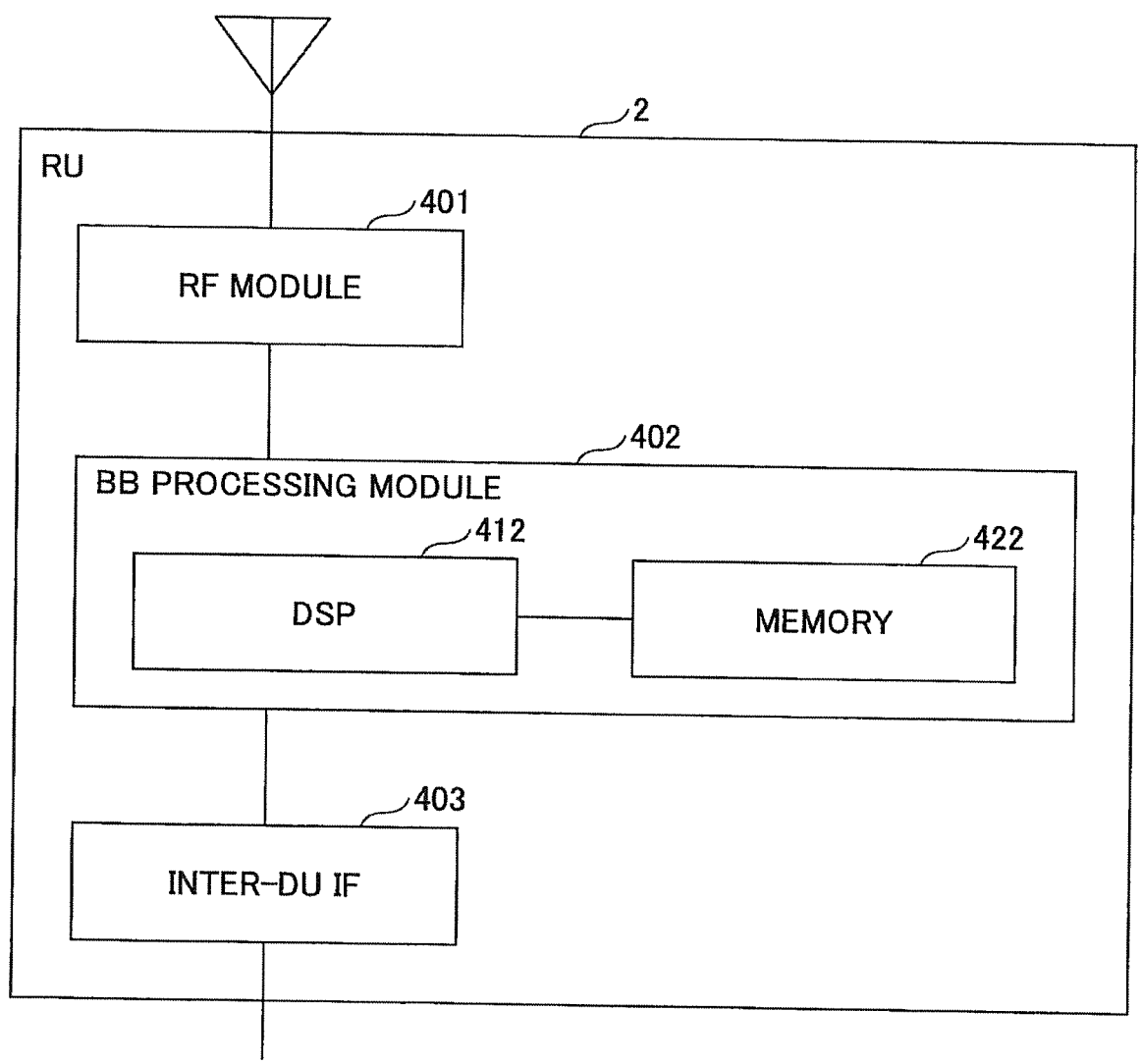
FIG. 18 is a diagram illustrating a hardware configuration example of a RU according to the embodiment.

FIG. 18 is a diagram illustrating a hardware configuration example of the RU according to the embodiment. FIG. 18 illustrates a configuration more similar to an implementation example than FIG. 16. As illustrated in FIG. 18, the RU 2 includes a RF (Radio Frequency) module 401 that performs processing on radio signals, a BB (Base Band) processing module 402 that performs baseband signal processing, and an inter-DU IF 403 which is an interface for connecting to the DU 1.

The RF module 401 generates radio signals to be transmitted from an antenna by performing D/A (Digital-to- Analog) conversion, modulation, frequency conversion, power amplification, and the like on the digital baseband signals received from the BB processing module 402. Moreover, the RF module 401 generates digital baseband signals by performing frequency conversion, A/D (Analog to Digital) conversion, demodulation, and the like on the received radio signals and delivers the generated digital baseband signals to the BB processing module 402. The RF module 401 includes an RF function. The RF module 401 includes the inter-UE signal transmission unit 203 and the inter-UE signal reception unit 204 illustrated in FIG. 11, for example.

The BB processing module 402 performs a process of converting signals transmitted and received to and from the DU 1 via the inter-DU IF 403 to the digital baseband signals or vice versa. A DSP (Digital Signal Processor) 412 is a processor that performs signal processing in the BB processing module 402. A memory 422 is used as a work area of the DSP 412. The BB processing module 402 includes a portion of the inter-UE signal transmission unit 203, a portion of the inter-UE signal reception unit 204, the LBT processing unit 205, the notification unit 206, and the measurement unit 207, for example.

The inter-DU IF 403 has a function of connecting a physical line of the photograph that connects the DU 1 and the RU and a function of terminating the protocol used by the FH. The inter-BBU IF 403 includes the inter-DU signal transmission unit 201 and the inter-DU signal reception unit 202 illustrated in FIG. 16, for example.

SUMMARY

According to the embodiment, there is provided a base station used as a first base station in a wireless communication system including the first base station, a second base station that communicates with the first base station, and a user equipment that communicates with the first base station, the base station including: a reception unit that receives a parameter used for performing communication in a specific band and data to be transmitted toward the user equipment from the second base station; and a detection unit that performs a process of detecting a use state of the specific band according to the parameter when the data is transmitted to the user equipment. Due to this base station, it is possible to provide a technique capable of detecting a use state of a specific band in a C-RAN wireless communication network.

The parameter may include all or some of information indicating whether or not to perform the process of detecting the use state of the specific band, information indicating a largest time of a random backoff time, information indicating a carrier sense time, and information indicating a frequency range of the specific band. Due to this, the DU 1 can instruct the RU 2 to perform the operation of the LBT process in various ways.

The parameter may include all or some of information indicating a largest successive transmission time, information indicating transmission power, information indicating a data transmission starting symbol position, and information indicating a data transmission ending symbol position, and the base station may further include a transmission unit that transmits the data according to the parameter when it is determined that the data transmission can be performed in the process of detecting the use state of the specific band. In this way, the DU 1 can instruct the RU 2 to perform the operation during data transmission in various ways when it is determined in the LBT process that data transmission can be performed.

The base station may further include a notification unit that reports (transmits) information indicating whether transmission of the data in the transmission unit has been completed and a setting value used in the process of detecting the use state of the specific band to the second base station. In this way, the DU 1 can change a LAA processing method to be performed by the RU 2 in various ways based on a feedback from the RU 2.

The detection unit may collect information on a communication device present in the specific band, and the notification unit may report (transmit) the collected information on the communication device present in the specific band to the second base station. In this way, the DU 1 can perform an operation of changing LAA processing parameters based on a predetermined logic according to the reported (transmitted) surrounding wireless system information.

The parameter may include the same measurement setting information as measurement setting information reported (transmitted) from the second base station to the user equipment, and the base station may further include: a measurement unit that measures reception strength of a radio signal received by the base station based on the measurement setting information and reports (transmits) the measured reception strength of the radio signal to the second base station. In this way, the DU 1 can detect the presence of a hidden terminal or the like, for example.

According to the embodiment, there is provided a transmission method executed by a base station used as a first base station in a wireless communication system including the first base station, a second base station that communicates with the first base station, and a user equipment that communicates with the first base station, the transmission method including: receiving a parameter used for performing communication in a specific band and data to be transmitted toward the user equipment from the second base station; and performing a process of detecting a use state of the specific band according to the parameter when the data is transmitted to the user equipment. Due to this transmission method, it is possible to provide a technique capable of detecting a use state of a specific band in a C-RAN wireless communication network.

Supplementary Explanation According to Embodiment

The DU 1 and the RU 2 may support any one of the "second processing procedure" and the "second processing procedure" and may support both. When both processing procedures are supported, an instruction as to which processing procedure is to be applied may be sent from the DU 1 to the RU 2.

The configurations of the devices (the user equipment UE, the DU 1, and the RU 2) described in the embodiment may be realized when a program is executed by a CPU (a processor) in the device including the CPU and the memory. The configurations may be realized by hardware such as a hardware circuit that includes the logics of the processes described in the present embodiment and may be realized by a combination of a program and hardware.

While the embodiment of the invention has been described, the disclosed invention is not limited to such an embodiment, and various variations, modifications, alterations, and substitutions could be conceived by those skilled in the art. While specific examples of numerical values are used in order to facilitate understanding of the invention, these numerical values are examples only and any other appropriate values may be used unless otherwise stated particularly. The classification of items in the description is not essential in the invention, and features described in two or more items may be used in combination, and a feature described in a certain item may be applied to a feature described in another item (unless contradiction occurs). It is not always true that the boundaries of the functional units or the processing units in the functional block diagram correspond to boundaries of physical components. The operations of a plurality of functional units may be physically performed by a single component. Alternatively, the operations of the single functional unit may be physically performed by a plurality of components. The orders in the sequence and the flowchart described in the embodiment may be switched unless contradiction occurs. For convenience of explanation of processing, the user equipment UE, the DU 1, and the RU 2 have been explained using functional block diagrams. However, these devices may be implemented by hardware, software, or a combination thereof. The software that operates by a processor included in the user equipment UE according to the embodiment of the invention, the software that operates by a processor included in the DU 1 according to the embodiment of the invention, and the software that operates by a processor included in the RU 2 according to the embodiment may be stored in a random access memory (RAM), a flash memory, a read only memory (ROM), an EPROM, an EEPROM, a register, a hard disk (HDD), a removable disk, a CD-ROM, a database, a server, and other appropriate storage media.

In the embodiment, the RU 2 is an example of a first base station. The DU 1 is an example of a second base station. The LAA processing parameter is an example of a "parameter used for performing communication in a specific band". The LBT is an example of a "process of detecting a use state of a specific band". The LBT processing unit 205 is an example of a detection unit.

Information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

An aspect/embodiment described in the present specification may be applied to a system that uses LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), other appropriate systems, and/or a next generation system enhanced based thereon.

Determination or judgment may be performed according to a value (0 or 1) represented by a bit, may be performed according to a boolean value (true or false), or may be performed according to comparison of numerical values (e.g., comparison with a predetermined value).

It should be noted that the terms described in the present specification and/or terms necessary for understanding the present specification may be replaced by terms that have the same or similar meaning. For example, a channel and/or a symbol may be a signal. Further, a signal may be a message.

There is a case in which a UE may be referred to as a subscriber station, a mobile unit, subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

An aspect/embodiment described in the present specification may be used independently, may be used in combination, or may be used by switching according to operations. Further, transmission of predetermined information (e.g., transmission of "it is X") is not limited to explicitly-performed transmission. The transmission of predetermined information may be performed implicitly (e.g., explicit transmission of predetermined information is not performed).

As used herein, the term "determining" may encompasses a wide variety of actions. For example, "determining" may be regarded as calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining.

As used herein, the phrase "based on" does not mean, unless otherwise noted, "based on only". In other words, the phrase "base on" means both "based on only" and "based on at least".

Also, the order of processing steps, sequences or the like of an aspect/embodiment described in the present specification may be changed as long as there is no contradiction. For example, in a method described in the present specification, elements of various steps are presented in an exemplary order. The order is not limited to the presented specific order.

Input/output information, etc., may be stored in a specific place (e.g., memory) or may be stored in a management table. The input/output information, etc., may be overwritten, updated, or added. Output information, etc., may be deleted. Input information, etc., may be transmitted to another apparatus.

Transmission of predetermined information (e.g., transmission of "it is X") is not limited to explicitly-performed transmission. The transmission of predetermined information may be performed implicitly (e.g., explicit transmission of predetermined information is not performed).

Information, a signal, etc., described in the present specification may be represented by using any one of the various different techniques. For example, data, an instruction, a command, information, a signal, a bit, a symbol, a chip or the like described throughout in the present specification may be represented by voltage, current, electromagnetic waves, magnetic fields or a magnetic particle, optical fields or a photon, or any combination thereof.

The present invention is not limited to the above embodiments and various variations, modifications, alternatives, replacements, etc., may be included in the present invention without departing from the spirit of the invention.

The present application is based on and claims the benefit of priority of Japanese Priority Application No. 2016-

012528 filed on Jan. 26, 2016, the entire contents of which are hereby incorporated by reference.

EXPLANATIONS OF LETTERS OR NUMERALS

1 DU
2 RU
UE User equipment
101 Inter-RU signal transmission unit
102 Inter-RU signal reception unit
103 Scheduling processing unit
104 Parameter generation unit
201 Inter-DU signal transmission unit
202 Inter-DU signal reception unit
203 Inter-UE signal transmission unit
204 Inter-UE signal reception unit
205 LBT processing unit
206 Notification unit
207 Measurement unit
301 Inter-DU IF
302 BB processing module
303 Device control module
304 Communication IF
401 RF module
402 BB processing module
403 Inter-DU IF

The invention claimed is:

1. A base station used as a first base station in a wireless communication system including the first base station, a second base station that communicates with the first base station, and a user equipment that communicates with the first base station, the base station comprising:
a receiver that receives a parameter used for performing communication in a specific band and data to be transmitted toward the user equipment from the second base station; and
a processor that performs a process of detecting a use state of the specific band according to the parameter when the data is transmitted to the user equipment.

2. The base station according to claim 1, wherein
the parameter includes all or some of information indicating whether or not to perform the process of detecting the use state of the specific band, information indicating a largest time of a random backoff time, information indicating a carrier sense time, and information indicating a frequency range of the specific band.

3. The base station according to claim 2, wherein
the parameter includes all or some of information indicating a largest successive transmission time, information indicating transmission power, information indicating a data transmission starting symbol position, and information indicating a data transmission ending symbol position, the base station further comprising:
a transmitter that transmits the data according to the parameter when the processor determines that the data transmission can be performed in the process of detecting the use state of the specific band.

4. The base station according to claim 2, wherein
the parameter includes the same measurement setting information as measurement setting information transmitted from the second base station to the user equipment,
the processor measures reception strength of a radio signal received by the base station based on the measurement setting information, and
the transmitter transmits the measured reception strength of the radio signal to the second base station.

5. The base station according to claim 1, wherein
the parameter includes all or some of information indicating a largest successive transmission time, information indicating transmission power, information indicating a data transmission starting symbol position, and information indicating a data transmission ending symbol position, the base station further comprising:
a transmitter that transmits the data according to the parameter when the processor determines that the data transmission can be performed in the process of detecting the use state of the specific band.

6. The base station according to claim 5, wherein
the parameter includes the same measurement setting information as measurement setting information transmitted from the second base station to the user equipment,
the processor measures reception strength of a radio signal received by the base station based on the measurement setting information, and
the transmitter transmits the measured reception strength of the radio signal to the second base station.

7. The base station according to claim 5,
wherein the transmitter transmits information indicating whether transmission of the data in the transmitter has been completed and a setting value used in the process of detecting the use state of the specific band to the second base station.

8. The base station according to claim 7, wherein
the processor collects information on a communication device present in the specific band, and
the transmitter transmits the collected information on the communication device present in the specific band to the second base station.

9. The base station according to claim 8, wherein
the parameter includes the same measurement setting information as measurement setting information transmitted from the second base station to the user equipment,
the processor measures reception strength of a radio signal received by the base station based on the measurement setting information, and
the transmitter transmits the measured reception strength of the radio signal to the second base station.

10. The base station according to claim 7, wherein
the parameter includes the same measurement setting information as measurement setting information transmitted from the second base station to the user equipment,
the processor measures reception strength of a radio signal received by the base station based on the measurement setting information, and
the transmitter transmits the measured reception strength of the radio signal to the second base station.

11. The base station according to claim 1, wherein
the parameter includes the same measurement setting information as measurement setting information transmitted from the second base station to the user equipment,
the processor measures reception strength of a radio signal received by the base station based on the measurement setting information, and
the transmitter transmits the measured reception strength of the radio signal to the second base station.

12. A transmission method executed by a base station used as a first base station in a wireless communication system including the first base station, a second base station that communicates with the first base station, and a user equipment that communicates with the first base station, the transmission method comprising:
  receiving a parameter used for performing communication in a specific band and data to be transmitted toward the user equipment from the second base station; and
  performing a process of detecting a use state of the specific band according to the parameter when the data is transmitted to the user equipment.

* * * * *